Patented Oct. 1, 1935

2,016,109

UNITED STATES PATENT OFFICE 2,016,109

SULPHURIC ESTER OF MONO-ACETALS

Fritz Guenther, Ludwigshafen-on-the-Rhine, Germany, assignor to I. G. Farbenindustrie Aktiengesellschaft, Frankfort - on - the - Main, Germany No Drawing. Application April 13, 1931, Serial No. 529,793. In Germany April 23, 1930

16 Claims. (Cl. 260—99.12)

The present invention relates to the production of condensation products suitable for use as assistants in the textile and related industries.

I have found that new and generally water-soluble condensation products can be obtained by acting on aliphatic, i. e. open chain or cycloaliphatic alcohols, or aliphatic alcohols containing aromatic or hydroaromatic radicals, with sulphonating agents in the presence of aliphatic carbonyl compounds, i. e. aldehydes or ketones or both. The alcohols may contain non-acid substituents, such as halogen, nitro or amino groups. Generally speaking 1 molecular proportion of aldehyde or ketone per molecular proportion of alcohol is sufficient but also lower or higher quantities of aldehyde or ketone may be employed.

Suitable aliphatic alcohols for carrying out the process comprise, for example, methanol, ethanol, propanol, the butanols, hexyl alcohol, decanol or dodecanol; cetyl alcohol, octadecyl alcohol, alcohols from waxes, alcohols from wool fat or from the destructive oxidation of paraffin wax and like hydrocarbons of high molecular weight; also the cyclohexanols, benzyl alcohol, tolyl alcohols, xylyl alcohols and the like. The aldehydes employed comprise, for example, formaldehyde, acetaldehyde, propionic aldehyde, cyclohexanone and like compounds containing up to 9 carbon atoms; also compounds which behave like aldehydes, such as acetals, as for example methylal, aldehyde bisulphites, such as acetaldehyde bisulphite, aldehyde ammonia compounds, such as acetaldehyde-ammonia, hexamethylenetetramine, also paraformaldehyde, trioxymethylene and the like, may be employed. For the sake of brevity, the aldehydes and compounds which behave like aldehydes will be referred to in the following and in the claims as aldehydic compounds. Not only are the true ketones, such as acetone, methyl ethyl ketone, phorones and the like suitable as ketones, but also substances which behave like ketones, such as ketone bisulphites, ketonimines and the like. The sulphonating agents employed for the preparation of the new products comprise, for example, concentrated sulphuric acid, oleum or chlorosulphonic acid which are employed in quantities at least equimolecular to those of the carbonyl compound. The condensation may be performed in the presence of inert solvents or diluents, such as carbon tetrachloride or ethyl ether and in the presence of substances which accelerate the reaction by removing water, such as acetic anhydride or like aliphatic carboxylic anhydride, phosphorus oxychloride, phosphorus pentoxide and the like. The products constitute apparently sulphuric esters of mono-acetals corresponding to the formula

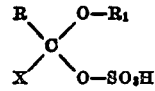

in which R is hydrogen or an aliphatic radicle, $R_1$ is the same radicle as R or another aliphatic radicle, preferably containing at least 8 carbon atoms and which may contain an aromatic substituent and X is hydrogen or the same as or another aliphatic radicle than R.

The new products obtained in this manner are generally speaking readily soluble not only in water but also in acid or alkaline aqueous solutions. The condensation products derived from higher alcohols have good wetting and washing properties and dispersive properties in respect of substances of the most divergent kinds. Thus, for example, hydrocarbons, such as benzene, tetrahydronaphthalene, petroleum or other mineral oils, lubricating oils, derivatives of hydrocarbons, such as tetra- or tri-chlor ethane or chlorbenzene, further amyl alcohol or cyclohexanol and similar water-insoluble alcohols and esters or ethers, such as amyl acetate or ethylene glycol cresyl ethers, or ketones as for example cyclohexanone or fats and fatty oils, such as olive oil or olein can be easily emulsified or homogeneously suspended in aqueous solutions. The products from alcohols containing at least 8 and up to say 18 carbon atoms are particularly valuable since their efficiency is not reduced in strongly saline or alkaline baths.

The following examples will further illustrate the nature of this invention, but the invention is not restricted to these examples. The parts are by weight.

Example 1

400 parts of sulphuric acid monohydrate, 50 parts of paraformaldehyde and 54 parts of octadecyl alcohol are stirred for a few hours at about 25° C., and are then heated for from 5 to 6 hours longer at a temperature of about 50° C., until a sample is found to dissolve to a clear solution in water. The mixture is poured on to ice and after removing the surplus sulphuric acid by treatment with lime, the solution of the calcium salt is converted into the sodium salt in any known or suitable manner. The solution of the resulting salt possesses good wetting, foaming and emulsifying properties. The product is efficient in neutral, acid, strongly saline and strongly alkaline aqueous solutions.

Example 2

47 parts of a mixture of alcohols having a boiling point of from about 85° to 185° C. at 20 millimeters of mercury and obtained by the catalytic reduction with the aid of hydrogen of coco fat, are stirred with 10 parts of trioxymethylene and 150 parts of sulphuric acid monohydrate for 22 hours at room temperature, the reaction mixture then being warmed to about 50° C. for from 1 to 2 hours. The reaction mixture is then poured onto ice and the sodium salt of the condensation product obtained is then recovered from the resulting solution as described in Example 1. If the neutralization with the aid of lime be carried out at a low temperature, such as about 35° C., a yield of sodium salt is obtained which is 4 times as great as that obtainable under the same conditions of working but without the addition of trioxymethylene.

Example 3

A mixture of 50 parts of cyclohexanol and 57 parts of methylal is slowly introduced at from 15° to 25° C. into 200 parts of sulphuric acid monohydrate, the reaction mixture then being stirred at about 20° C. for from 2 to 3 hours. The reaction product which is practically completely soluble in water, is poured into 1000 parts of a mixture of equal parts of ice and water and the mixture is then rendered neutral with the aid of aqueous caustic soda solution, the reaction product separating out thereby as a tough mass; the product is then separated from the aqueous solution and freed from oily constituents present by redissolution in water, separating the oil and evaporating the solution or salting out.

If the methylal be replaced by paraformaldehyde a water-soluble condensation product is obtained whereas when acting with sulphuric acid monohydrate on cyclohexanol alone under otherwise identical conditions of working an oil insoluble in water is obtained.

What I claim is:

1. The process for the production of condensation products which comprises acting with a sulphonating agent on an aliphatic alcohol in the presence of an aliphatic carbonyl compound selected from the group consisting of aldehydes and ketones, the quantity of the sulphonating agent being at least equimolecular to that of said carbonyl compound.

2. The process for the production of condensation products which comprises acting with a sulphonating agent on an aliphatic alcohol in the presence of a quantity of an aliphatic carbonyl compound selected from the group consisting of aldehydes and ketones, at least equimolecular to that of said alcohol, the quantity of the sulphonating agent being at least equimolecular to that of said carbonyl compound.

3. The process for the production of condensation products which comprises acting with a sulphonating agent on about equimolecular quantities of an aliphatic alcohol and of an aliphatic carbonyl compound selected from the group consisting of aldehydes and ketones, the quantity of the sulphonating agent being at least equimolecular to that of said carbonyl compound.

4. The process for the production of condensation products which comprises acting with concentrated sulphuric acid on an aliphatic alcohol in the presence of an aliphatic carbonyl compound selected from the group consisting of aldehydes and ketones, the quantity of the sulphonating agent being at least equimolecular to that of said carbonyl compound.

5. The process for the production of condensation products which comprises acting with a sulphonating agent on an aliphatic alcohol in the presence of a quantity of an aliphatic aldehyde at least equimolecular to that of said alcohol, the quantity of the sulphonating agent being at least equimolecular to that of said aldehyde.

6. The process for the production of condensation products which comprises acting with concentrated sulphuric acid on an aliphatic alcohol in the presence of a quantity of an aliphatic aldehyde at least equimolecular to that of said alcohol, the quantity of the sulphonating agent being at least equimolecular to that of said aldehyde.

7. The process for the production of condensation products which comprises acting with concentrated sulphuric acid on an aliphatic alcohol in the presence of a quantity of a formaldehyde compound at least equimolecular to that of said alcohol, the quantity of the sulphonating agent being at least equimolecular to that of said formaldehyde compound.

8. The process for the production of condensation products which comprises acting with a sulphonating agent on an aliphatic alcohol containing at least eight carbon atoms in the presence of a quantity of a formaldehyde compound at least equimolecular to that of said alcohol, the quantity of the sulphonating agent being at least equimolecular to that of said formaldehyde compound.

9. The process for the production of condensation products which comprises acting with concentrated sulphuric acid on an aliphatic alcohol containing at least eight carbon atoms in the presence of a quantity of a formaldehyde compound at least equimolecular to that of said alcohol, the quantity of the sulphonating agent being at least equimolecular to that of said formaldehyde compound.

10. Water-soluble condensation products of aliphatic alcohols and aliphatic carbonyl compounds, containing sulphuric ester radicles and corresponding to the formula

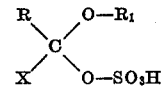

in which R is hydrogen or an aliphatic radicle, $R_1$ is the same aliphatic radicle as R or another aliphatic radicle and X is hydrogen or the same as or another aliphatic radicle than R.

11. Water-soluble condensation products of aliphatic alcohols and aliphatic aldehydes, containing sulphuric ester radicles and corresponding to the formula

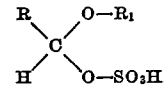

in which R is hydrogen or an aliphatic radicle and $R_1$ is the same as or another aliphatic radicle than R.

12. Water-soluble condensation products of aliphatic alcohols containing at least eight carbon atoms and aliphatic aldehydes, containing sulphuric ester radicles and corresponding to the formula

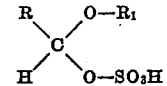

in which R is hydrogen or an aliphatic radicle and $R_1$ is an aliphatic radicle containing at least eight carbon atoms.

13. Water-soluble condensation products of aliphatic alcohols and formaldehyde, containing sulphuric ester radicles and corresponding to the formula

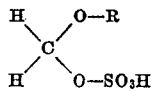

in which R is an aliphatic radicle.

14. Water-soluble condensation products of aliphatic alcohols containing at least eight carbon atoms and formaldehyde, containing sulphuric ester radicles and corresponding to the formula

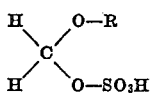

in which R is an aliphatic radicle containing at least eight carbon atoms.

15. A water-soluble condensation product of octadecyl alcohol and formaldehyde, containing sulphuric ester radicles and corresponding to the formula

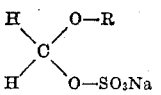

in which —O—R is the octadecyl radicle.

16. A water-soluble condensation product of alcohols having a boiling point between about 85° and about 185° C. at 20 millimeters mercury gauge and resulting from the catalytic hydrogenation of cocoanut fat and formaldehyde, containing sulphuric ester radicles and corresponding to the formula

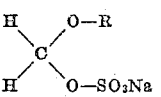

in which —O—R denotes the radicles of said alcohols.

FRITZ GUENTHER.